(12) United States Patent
Prasad et al.

(10) Patent No.: US 11,949,465 B2
(45) Date of Patent: Apr. 2, 2024

(54) MACHINE LEARNING BASED CHANNEL STATE INFORMATION ESTIMATION AND FEEDBACK CONFIGURATION

(71) Applicant: Nokia Technologies Oy, Espoo (FI)

(72) Inventors: Athul Prasad, Naperville, IL (US); Amitabha Ghosh, Buffalo Grove, IL (US); Gilsoo Lee, Naperville, IL (US); Jie Chen, Naperville, IL (US); Jun Tan, Glenview, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 44 days.

(21) Appl. No.: 17/180,061

(22) Filed: Feb. 19, 2021

(65) Prior Publication Data

US 2022/0271851 A1 Aug. 25, 2022

(51) Int. Cl.
*H04B 17/391* (2015.01)
*G06N 20/00* (2019.01)
*H04B 7/06* (2006.01)

(52) U.S. Cl.
CPC ......... *H04B 17/3913* (2015.01); *G06N 20/00* (2019.01); *H04B 7/0626* (2013.01); *H04B 7/0652* (2013.01)

(58) Field of Classification Search
CPC .... G06N 20/00; H04B 7/0626; H04B 7/0652; H04B 17/3913
See application file for complete search history.

(56) References Cited

U.S. PATENT DOCUMENTS

| 9,979,456 B1 | 5/2018 | Akoum et al. |
| 10,531,415 B2 | 1/2020 | O'shea et al. |
| 2016/0050653 A1* | 2/2016 | Rastogi ................. H04W 24/08 455/453 |

(Continued)

FOREIGN PATENT DOCUMENTS

| WO | 2020/062022 A1 | 4/2020 |
| WO | 2020/213964 A1 | 10/2020 |

(Continued)

OTHER PUBLICATIONS

International Search Report and Written Opinion received for corresponding Patent Cooperation Treaty Application No. PCT/EP2022/052422, dated Jun. 3, 2022, 14 pages.

(Continued)

*Primary Examiner* — Elton Williams
(74) *Attorney, Agent, or Firm* — Robert P. Michal, Esq.; Carter, DeLuca & Farrell LLP (57) ABSTRACT

Systems, methods, apparatuses, and computer program products for machine learning based channel state information (CSI) estimation and feedback configuration are provided. A method may include learning channel state information feedback from one or more user equipment as time series data. The method may also include building a predictive model for user equipment feedback based on the learned channel state information feedback. The method may further include configuring a channel state information trigger with the one or more user equipment based on the predictive model. In addition, the method may include signaling predicted channel state information to the one or more user equipment.

7 Claims, 9 Drawing Sheets

(56) References Cited

U.S. PATENT DOCUMENTS

| | | | |
|---|---|---|---|
| 2020/0052758 A1 | 2/2020 | Akoum et al. | |
| 2020/0220593 A1 | 7/2020 | Wen et al. | |
| 2020/0322095 A1 | 10/2020 | Park et al. | |
| 2021/0258991 A1* | 8/2021 | Bao | H04L 25/0254 |
| 2021/0376895 A1* | 12/2021 | Xue | H04L 1/1861 |

FOREIGN PATENT DOCUMENTS

| | | |
|---|---|---|
| WO | 2020/226542 A1 | 11/2020 |
| WO | 2020/234902 A1 | 11/2020 |

OTHER PUBLICATIONS

"3rd Generation Partnership Project; Technical Specification Group Radio Access Network; NR; Physical layer procedures for data (Release 16)", 3GPP TS 38.214, 16.3.0, Sep. 2020, pp. 1-166.

"3rd Generation Partnership Project; Technical Specification Group Radio Access Network; NR; Multiplexing and channel coding (Release 16)", 3GPP TS 38.212, V16.3.0, Sep. 2020, pp. 1-152.

3rd Generation Partnership Project; Technical Specification Group Radio Access Network; NR; Physical layer procedures for control (Release 16), 3GPP TS 38.213, V16.3.0, Sep. 2020, pp. 1-179.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"3rd Generation Partnership Project; Technical Specification Group Radio Access Network; NR; Physical channels and modulation (Release 16)", 3GPP TS 38.211, V16.3.0, Sep. 2020, pp. 1-133.

Li et al., "Deep Learning-Based Massive MIMO CSI Feedback", 18th International Conference on Optical Communications and Networks (ICOCN), Aug. 5-8, 2019, 3 pages.

Yuan et al., "Machine Learning-Based Channel Prediction in Massive MIMO With Channel Aging", IEEE Transactions on Wireless Communications, vol. 9, No. 5, May 2020, pp. 2960-2973.

"SOD on Use Cases for SI on Data Collection", 3GPP TSG-RAN WG3 #110-e, R3-206874, Agenda : 18.3, Huawei—8 Moderator, Nov. 2-12, 2020, 10 pages.

* cited by examiner

MACHINE LEARNING BASED CHANNEL STATE INFORMATION ESTIMATION AND FEEDBACK CONFIGURATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for machine learning based channel state information (CSI) estimation and feedback configuration.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments may be directed to a method. The method may include learning channel state information feedback from one or more user equipment as time series data. The method may also include building a predictive model for user equipment feedback based on the learned channel state information feedback. The method may further include configuring a channel state information trigger with the one or more user equipment based on the predictive model. In addition, the method may include signaling predicted channel state information to the one or more user equipment.

Other example embodiments may be directed to an apparatus. The apparatus may include at least one processor and at least one memory including computer program code. The at least one memory and computer program code may also be configured to, with the at least one processor, cause the apparatus at least to learn channel state information feedback from one or more user equipment as time series data. The apparatus may also be caused to build a predictive model for user equipment feedback based on the learned channel state information feedback. The apparatus may further be caused to configure a channel state information trigger with the one or more user equipment based on the predictive model. In addition, the apparatus may be caused to signal predicted channel state information to the one or more user equipment.

Other example embodiments may be directed to an apparatus. The apparatus may include means for learning channel state information feedback from one or more user equipment as time series data. The apparatus may also include means for building a predictive model for user equipment feedback based on the learned channel state information feedback. The apparatus may further include means for configuring a channel state information trigger with the one or more user equipment based on the predictive model. In addition, the apparatus may include means for signaling predicted channel state information to the one or more user equipment.

In accordance with other example embodiments, a non-transitory computer readable medium may be encoded with instructions that may, when executed in hardware, perform a method. The method may include learning channel state information feedback from one or more user equipment as time series data. The method may also include building a predictive model for user equipment feedback based on the learned channel state information feedback. The method may further include configuring a channel state information trigger with the one or more user equipment based on the predictive model. In addition, the method may include signaling predicted channel state information to the one or more user equipment.

Other example embodiments may be directed to a computer program product that performs a method. The method may include learning channel state information feedback from one or more user equipment as time series data. The method may also include building a predictive model for user equipment feedback based on the learned channel state information feedback. The method may further include configuring a channel state information trigger with the one or more user equipment based on the predictive model. In addition, the method may include signaling predicted channel state information to the one or more user equipment.

Other example embodiments may be directed to an apparatus that may include circuitry configured to learn channel state information feedback from one or more user equipment as time series data. The apparatus may also include circuitry configured to build a predictive model for user equipment feedback based on the learned channel state information feedback. The apparatus may further include circuitry configured to configure a channel state information trigger with the one or more user equipment based on the predictive model. In addition, the apparatus may include circuitry configured to signal predicted channel state information to the one or more user equipment.

Some example embodiments may be directed to a method. The method may include signaling feedback information to a network element. The method may also include receiving predicted channel state information values or a predictive model from the network element, and a channel state information trigger based on the feedback information. The method may further include determining whether there is a difference between actual channel state information values and the predicted channel state information values or predicted values computed from the predictive model. In addition, the method may include signaling, according to the channel state information trigger, a channel state information report to the network element when it is determined that there is a difference between the actual channel state information values and the predicted channel state information values or the predicted values computed from the predictive model.

Other example embodiments may be directed to an apparatus. The apparatus may include at least one processor and at least one memory including computer program code. The at least one memory and computer program code may also be configured to, with the at least one processor, cause the apparatus at least to signal feedback information to a network element. The apparatus may also be caused to receive predicted channel state information values or a predictive model from the network element, and a channel state information trigger based on the feedback information. The apparatus may further be caused to determine whether there is a difference between actual channel state information values and the predicted channel state information values or predicted values computed from the predictive model. In addition, the apparatus may be caused to signal, according to the channel state information trigger, a channel state information report to the network element when it is determined that there is a difference between the actual channel state information values and the predicted channel state information values or the predicted values computed from the predictive model.

Other example embodiments may be directed to an apparatus. The apparatus may include means for signaling feedback information to a network element. The apparatus may also include means for receiving predicted channel state information values or a predictive model from the network element, and a channel state information trigger based on the feedback information. The apparatus may further include means for determining whether there is a difference between actual channel state information values and the predicted channel state information values or predicted values computed from the predictive model. In addition, the apparatus may include means for signaling, according to the channel state information trigger, a channel state information report to the network element when it is determined that there is a difference between the actual channel state information values and the predicted channel state information values or the predicted values computed from the predictive model.

In accordance with other example embodiments, a non-transitory computer readable medium may be encoded with instructions that may, when executed in hardware, perform a method. The method may include signaling feedback information to a network element. The method may also include receiving predicted channel state information values or a predictive model from the network element, and a channel state information trigger based on the feedback information. The method may further include determining whether there is a difference between actual channel state information values and the predicted channel state information values or predicted values computed from the predictive model. In addition, the method may include signaling, according to the channel state information trigger, a channel state information report to the network element when it is determined that there is a difference between the actual channel state information values and the predicted channel state information values or the predicted values computed from the predictive model.

Other example embodiments may be directed to a computer program product that performs a method. The method may include signaling feedback information to a network element. The method may also include receiving predicted channel state information values or a predictive model from the network element, and a channel state information trigger based on the feedback information. The method may further include determining whether there is a difference between actual channel state information values and the predicted channel state information values or predicted values computed from the predictive model. In addition, the method may include signaling, according to the channel state information trigger, a channel state information report to the network element when it is determined that there is a difference between the actual channel state information values and the predicted channel state information values or the predicted values computed from the predictive model.

Other example embodiments may be directed to an apparatus that may include circuitry configured to signal feedback information to a network element. The apparatus may also include circuitry configured to receive predicted channel state information values or a predictive model from the network element, and a channel state information trigger based on the feedback information. The apparatus may also include circuitry configured to determine whether there is a difference between actual channel state information values and the predicted channel state information values or predicted values computed from the predictive model. In addition, the apparatus may include circuitry configured to signal, according to the channel state information trigger, a channel state information report to the network element when it is determined that there is a difference between the actual channel state information values and the predicted channel state information values or the predicted values computed from the predictive model.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for machine learning based channel state information (CSI) estimation and feedback configuration.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

In certain cases, a network may configure channel state information (CSI) feedback from a user equipment (UE) based on various thresholds and triggers, in order to collect feedback from the UE related to a variety of factors. Such factors may include, for example, the radio conditions experienced by the UE. This feedback configuration may provide the gNB with additional information related to the real-time channel state and channel quality from the perspective of the UE. There may be a significant amount of flexibility that the system allows the gNB to configure the feedback based on the requirements of the traffic served, as well as the radio conditions experienced by the UE. The outcome of the feedback received from the UE may be to optimize the radio transmission parameters by the gNB, which may result in efficient reception of downlink data.

Figure 1:
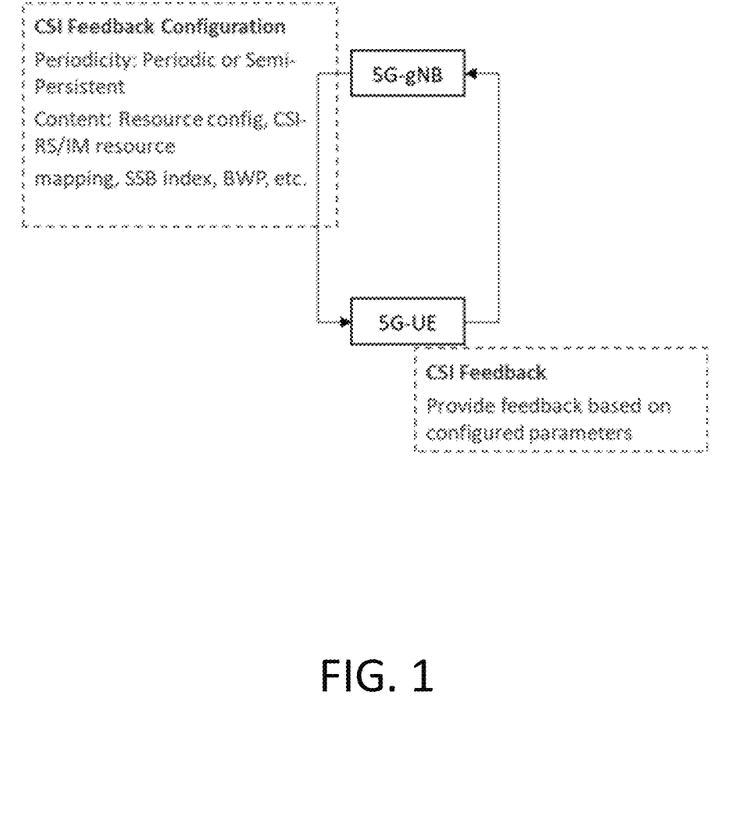
FIG. 1 illustrates an example of channel state information feedback configurations.

FIG. 1 illustrates an example of CSI feedback configurations. In particular, FIG. 1 illustrates the CSI feedback configuration framework from the gNB to the UE, and feedback information based on the configuration parameters from the UE back to the gNB. The CSI report framework may include feedback configurations and related triggering states. For instance, one triggering state may include aperiodic feedback where feedback CSI reports from UEs are triggered when the configured trigger conditions are satisfied. Another triggering state may include periodic/semi-persistent feedback configurations where CSI reports from UEs are configured with a fixed periodicity. In addition, feedback configurations may broadly include, for example, reporting quantity, reporting frequency configuration, time restrictions, and codebook configurations.

For reporting quantity, the UE may be informed about what exactly needs to be measured including, for example, CSI and layer 1-reference signal received power (L1-RSRP) related quantities. Further, reporting frequency configuration may include informing the UE whether wideband or sub-band granularity should be applied in the frequency domain. In addition, with time restrictions, which may be applicable for channel and interference measurements, the gNB may inform the UE whether there should be some form of time domain restrictions while measuring the channel or interference.

Based on the above configurations, the UE may provide feedback in the format of a CSI report to the network. In some cases, the feedback configurations in mobile networks may have evolved to enable the system to operate at an optimal point in terms of spectral efficiency, supporting mobility and responding to the real-time radio channel conditions experienced by the UE.

Figure 2:
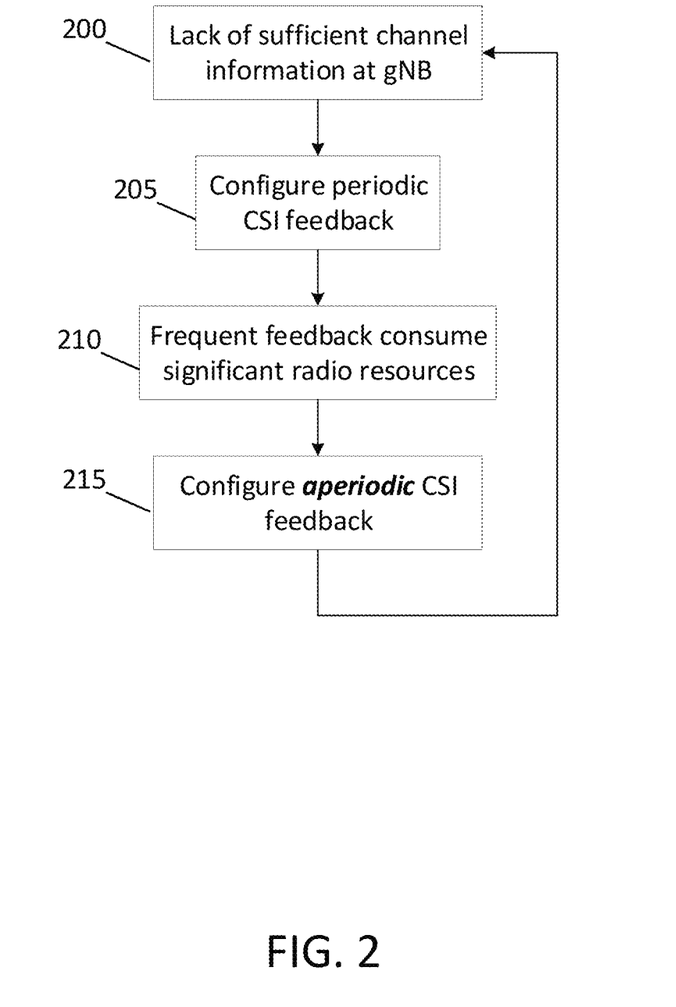
FIG. 2 illustrates an example flow diagram for a method of feedback configuration types and/or periodicity.

FIG. 2 illustrates an example flow diagram for a method of feedback configuration types and/or periodicity. In some cases, certain considerations related to the CSI feedback configurations may stem from the report configuration type/periodicity. For example, at 200, during instances where the gNB lacks sufficient information of a particular UE and requires frequency feedback, the gNB may, at 205, configure periodic CSI reports from the UE. On the other hand, at 210, when frequent feedback consumes significant radio resources, the gNB may, at 215, configure aperiodic CSI reports from the UE, which may be triggered by certain threshold conditions being satisfied.

In certain cases, the network may be designed based on stochastic approaches, with the gNB reacting to the instantaneous feedback from the UE. In addition, in some cases, signaling between the network/gNB and the UE may need to be robust enough to overcome forms of uncertainties. While this may be applicable from a system design perspective, with advances in machine learning and the ability of gNBs/network nodes to build statistical predictions of network environments, in combination with the application of domain knowledge, there could be optimizations available in terms of the interactions between the network and the UE. Such optimizations may not have been considered while designing how the network node/gNB interacts with the UE, which poses a problem that certain example embodiments may address.

In view of the problems described above, certain example embodiments may provide solutions at least for resources consumed for CSI feedback in certain systems including, for example, where the network and the radio channels to the users may be learned. Here, the user behavior over a sufficient period of time may be considered deterministic. Such systems may have high reliability requirements, which may be satisfied by configuring frequent CSI feedback reports. However, a problem may arise that even if the channel is learned in such systems and CSI information at the UE could be predicted by the network, due to the dynamic nature of the system, certain mechanisms may be necessary to ensure that the predicted values are accurate. However, there is currently not a standardized way to exchange this information between the network and the UE due to the classical information asymmetry problem—where each network node might have complete information regarding the channel measurements it conducts, but due to the limited feedback between the network nodes, there would be asymmetries between the network nodes in terms of information availability.

From currently defined specifications, it may be observed that the basic assumption while defining mechanisms for exchanging information between the nodes may be related to a stateless/memory-less system. While this core assumption may be valid as a system design principle for certain networks, it may be important to consider aspects related to learned models that may be applied to gNBs, and the resultant impact on the signaling between the gNB and the UE.

Certain example embodiments may not be related to feedback compression or UE feedback resource configuration. Instead, according to certain example embodiments, the network node/gNB may utilize statistical models and time series data to predict UE feedback, and define standardized information elements that could be utilized to optimize/minimize unnecessary UE feedback.

According to certain example embodiments, a network may learn the channel conditions encountered by one or more UEs. In some example embodiments, the network may learn the channel conditions by using time series models, and may utilize this information to minimize the feedback between the UE and the network. For instance, certain example embodiments may consider scenarios that are deterministic over time, which may imply that the gNB builds CSI feedback predictions per UE. In certain example embodiments, this may be based on feedback from all the UEs. Further, according to certain example embodiments, during the training phase, the network may learn CSI feedback from one or more UEs as time series data. For instance, in certain example embodiments, the learning aspect may be derived from the fact that the gNB (which may receive feedback from the UE about CRI-RI-CQI/L1-RSRP) may correlate information with the associated time information. In deterministic scenarios, the gNB may then be able to predict what the UE feedback would be, based on building predictive models about the initial feedback. In certain example embodiments, this training phase may use long short-term memory (LSTMs) to learn the CSI-resource indicator-rank indicator-channel quality indicator (CRI-RI-CQI) and L1-RSRP values for the configured measurement resources. According to certain example embodiments, it may be assumed that the measurement resources and other configurations may remain static.

In certain example embodiments, once the network learns the CSI feedback and builds a predictive model, the network may configure a new CSI trigger with the UE, which may override existing trigger states (e.g., aperiodic or semi-persistent). In some example embodiments, the new trigger state may inform the UE to send CSI feedback if the predicted CSI information is different from the observed/calculated value.

Certain example embodiments may provide various ways for signaling the predicted CSI information to the UE. For example, the network may transmit learned CSI feedback information to the UE periodically using new radio resource control (RRC) configuration(s) (e.g., CSI-PredictInfo). In this case, the UE may provide CSI report(s) if there is a significant difference between the predicted value and the calculated value. Here, significant difference may imply that the difference between the predicted and calculated values are greater than a configured threshold value. The difference may imply that there are uncertainties in the network that were not predicted by the model and hence may need to be compensated by, for example, triggering traditional feedback mechanisms. Alternately, the threshold value could be learned by the UE as well, depending on previous instances of radio link failures or an increase in packet loss rates and correlating such events with the difference between the predicted and calculated CSI feedback parameters. The UEs may also be selected based on k-means clustering that utilize training data where a large amount of variance is observed between the samples within the time-series data. Here, the value for variance may indicate the variability of the feedback parameters from the UE, which should remain substantially the same under ideal conditions, and could be provided as an input parameter to the gNB or could be learned based on previous instances of UEs experiencing radio link failures, increased HARQ-NACK feedback, packet loss rates, etc. In other example embodiments, the network may configure UEs with the learned model relevant for the UE (e.g., federated learning techniques may be applied here). Similar to the above way for signaling the predicted CSI information, if there is a difference between the predicted CSI feedback and the actual CSI, the UE may signal the delta between the predicted and actual CSI to the network.

Figure 3:
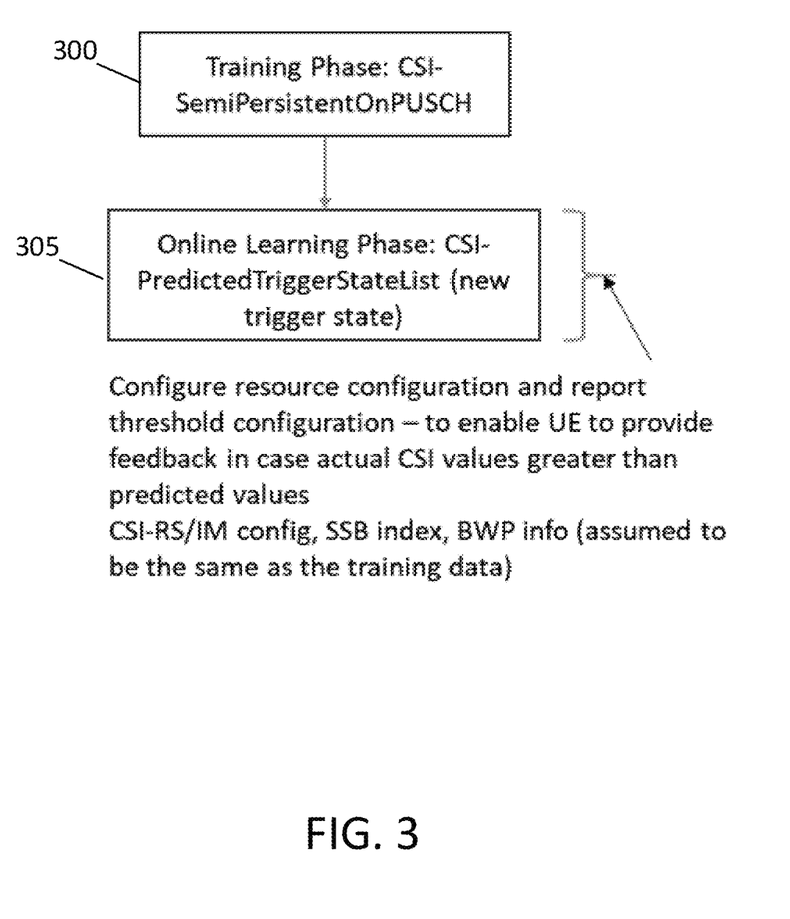
FIG. 3 illustrates an example flow diagram of machine learning phases, according to certain example embodiments.

FIG. 3 illustrates an example flow diagram of machine learning phases, according to certain example embodiments. As illustrated in FIG. 3, at 300, the network may enter a training phase during which the network may learn CSI feedback from the UEs as time series data. At this stage, the network may configure the UE with semi-persistent CSI feedback, thereby configuring the UE to report feedback data periodically to the network. At 305, the network may enter an online learning phase during which the network may configure resource configuration and report threshold configuration to enable the UE to provide feedback in case actual CSI values are greater than predicted values. This phase may enable the network to continually update the learned feedback model and possibly account for temporal variations in the network environment. According to certain example embodiments, the CSI-reference signal (CSI-RS) or CSI-interference management (CSI-IM) configuration, SSB index, and BWP information may be assumed to be the same as the training data.

According to certain example embodiments, new signaling may be transmitted from the gNB to the UE regarding sharing machine learning based predicted CSI feedback values. The new signaling may also include configurations related to UE-specific learned model from local estimation of the difference between the predicted and the actual feedback values. In both scenarios, new CSI feedback configuration may override existing feedback configuration.

Figure 4:
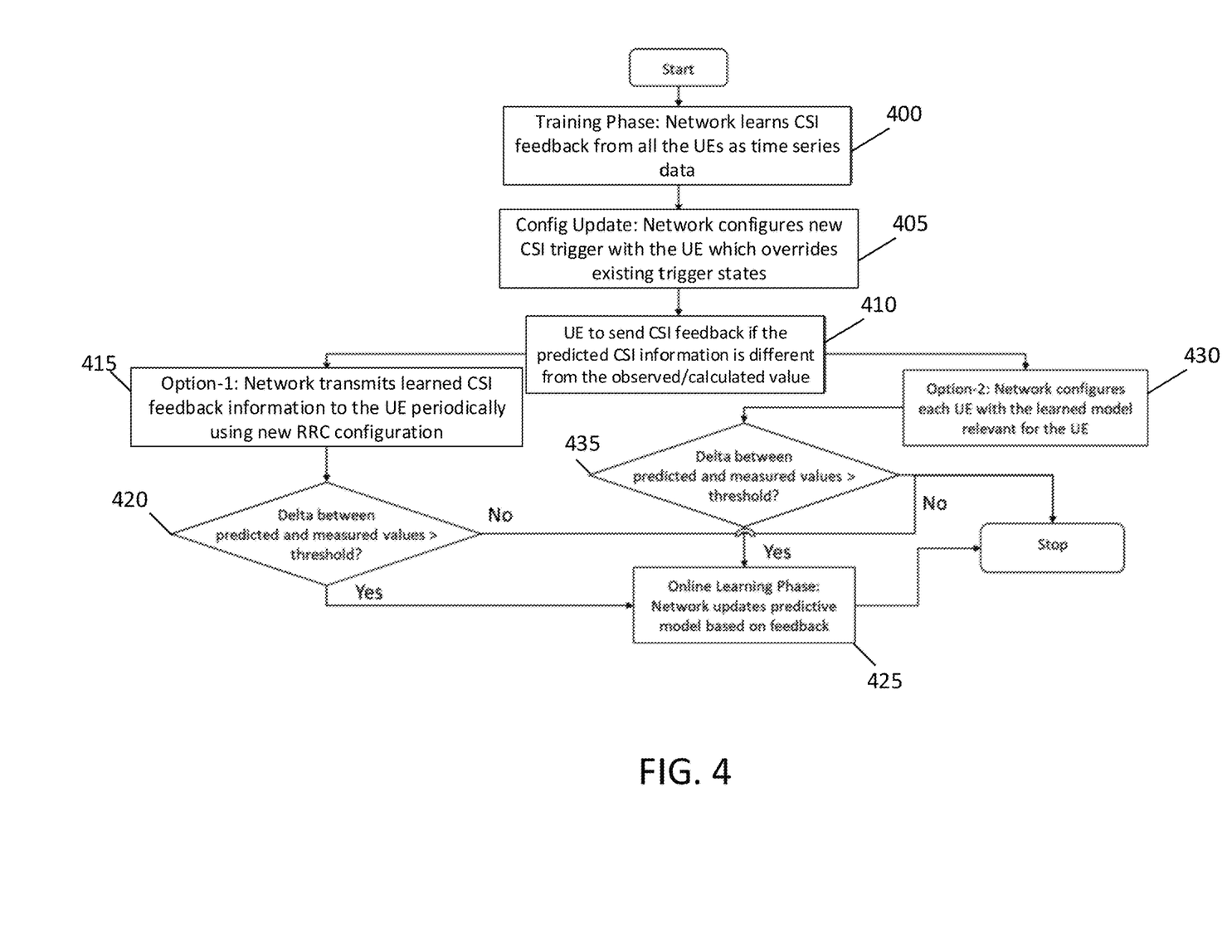
FIG. 4 illustrates an example flow chart of a method, according to certain example embodiments.

FIG. 4 illustrates an example flow chart of a method, according to certain example embodiments. At 400, the network (e.g., gNB) may enter a training phase where the network learns CSI feedback (e.g., CRI-RI-CQI and L1-RSRP values) from all the UEs as time series data. At 405, the network may configure a new CSI trigger with the UE, which overrides any existing trigger states (e.g., aperiodic or semi-persistent). At 410, the UE may send CSI feedback if the predicted CSI information is different from the observed/calculated value. At 415, the network may transmit learned CSI feedback information to the UE periodically using new RRC configuration (e.g., CSI-PredictInfo). At 420, the UE may determine if the difference between the predicted and the measured values is greater than a predefined and/or learned threshold. If yes, then at 425, the network may update the predictive model based on the feedback from the UE. If no, then the procedure may stop.

As further illustrated in FIG. 4, at 430, the network may configure one or more UEs with the learned model relevant to the UE(s). At 435, the UE may determine if the difference between the predicted and the measured values is greater than a predefined threshold. If yes, then, at 425, the network may update the predictive model based on the feedback from the UE. If no, the procedure stops.

Figure 5:
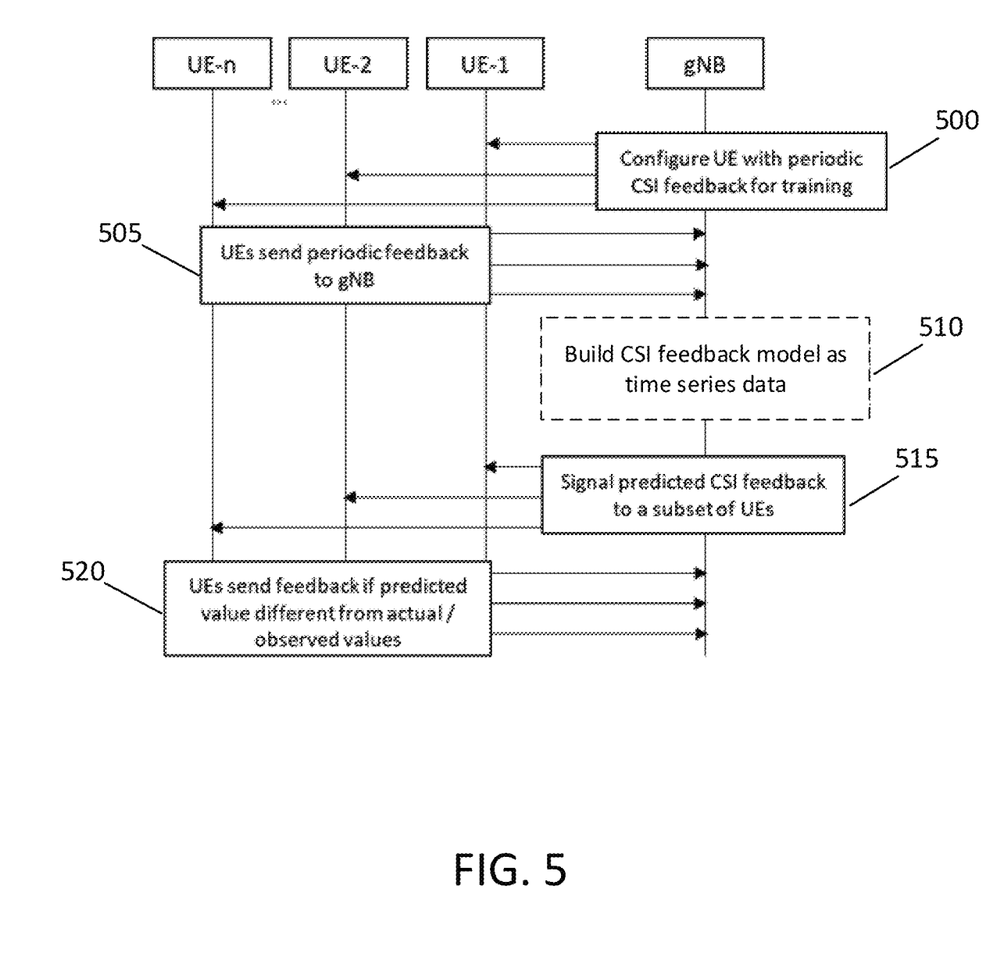
FIG. 5 illustrates an example flow diagram of a first option for signaling predicted CSI to the user equipment (UE), according to certain example embodiments.

FIG. 5 illustrates an example flow diagram of a first option for signaling predicted CSI information to the UE, according to certain example embodiments. At 500, the gNB may configure the UE with periodic CSI feedback for training. At 505, the UEs may send periodic feedback information to the gNB. At 510, the gNB may build a CSI feedback model as time series data using LSTMs/polynomial regression. At 515, the gNB may signal predicted CSI feedback to a subset of UEs (e.g., one or more UEs). At 520, the UEs may send feedback information to the gNB if there is a difference between the predicted value from the actual or observed values.

Figure 6:
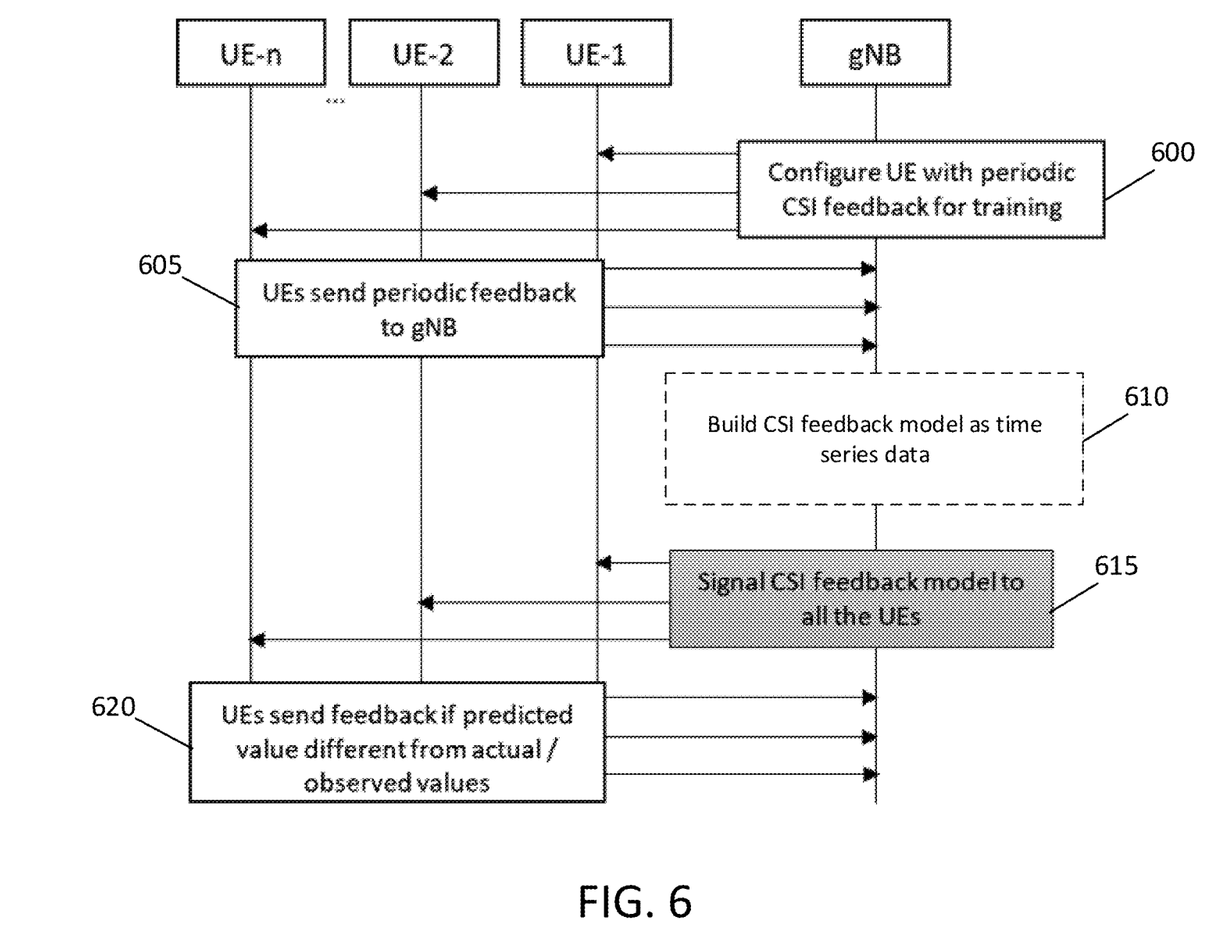
FIG. 6 illustrates an example flow diagram of a second option for signaling predicted CSI information to the UE, according to certain example embodiments.

FIG. 6 illustrates an example flow diagram of a second option for signaling predicted CSI information to the UE, according to certain example embodiments. At 600, the gNB may configure the UE with periodic CSI feedback for training. At 605, the UEs may send periodic feedback information to the gNB. At 610, the gNB may build a CSI feedback model as time series data using LSTMs/polynomial regression. At 615, the gNB may signal a CSI feedback model to the UEs (e.g., one or more UEs). At 620, the UEs may send feedback information to the gNB if there is a difference between the predicted value from the actual or observed values.

Figure 7:
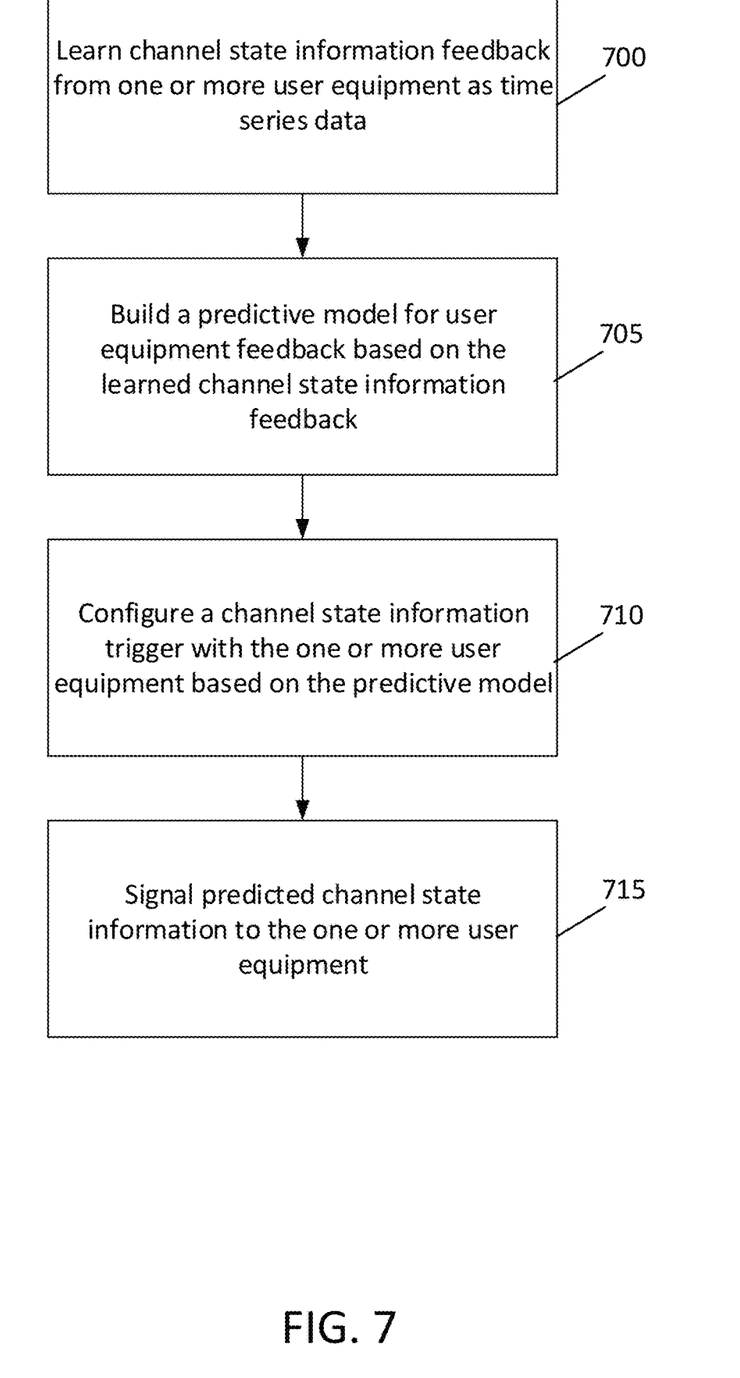
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a gNB, for instance similar to apparatus 20 illustrated in FIG. 9(b).

According to certain example embodiments, the method of FIG. 7 may include, at 700, learning channel state information feedback from one or more user equipment as time series data. The method may also include, at 705, building a predictive model for user equipment feedback based on the learned channel state information feedback. The method may further include, at 710, configuring a channel state information trigger with the one or more user equipment based on the predictive model. In addition, at 715, the method may include signaling predicted channel state information to the one or more user equipment.

In certain example embodiments, time series data may include data transmitted by user equipment that is associated with corresponding time information. Time information may include a time of day, a date, a day of the week, and/or another indication of a time associated with transmitted data. According to certain example embodiments, signaling the predicted channel state information may include signaling the learned channel state information feedback to the one or more user equipment. According to other example embodiments, the method may also include generating a learned model from the learned channel state information feedback. According to some example embodiments, signaling the predicted channel state information may include configuring the one or more user equipment with the learned model. In certain example embodiments, the channel state information trigger may configure the one or more user equipment to send channel state information feedback when a predicted channel state information differs from an observed or computed value. According to certain example embodiments, the difference for triggering feedback may be based on a configured or learned threshold value. In some example embodiments, when the predicted channel state information is different from an observed value, the method may further include receiving channel state information feedback from the one or more user equipment. In other example embodiments, the method may also include updating the predictive model based on the received channel state information feedback from the one or more user equipment.

Figure 8:
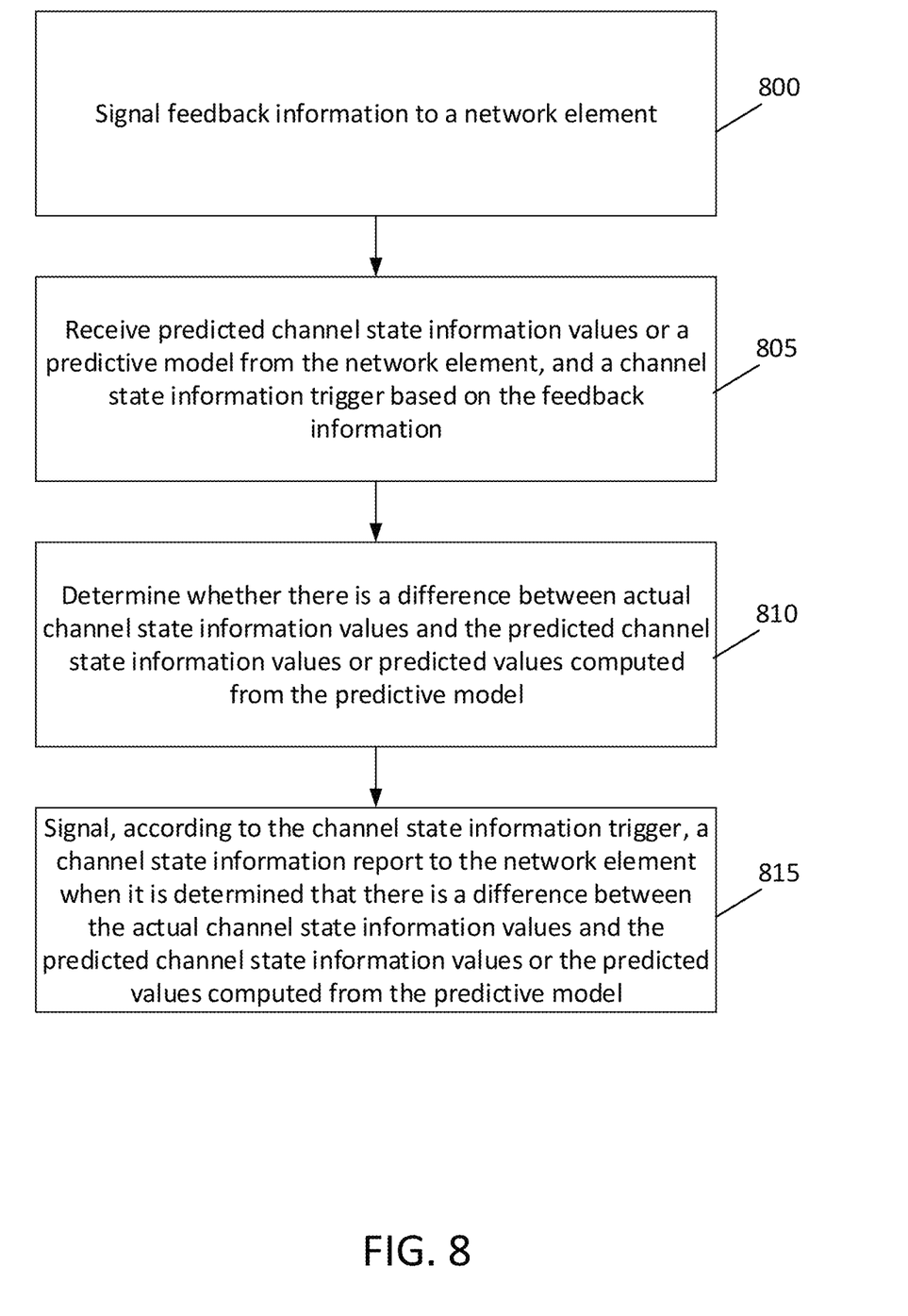
FIG. 8 illustrates an example flow diagram of another method, according to certain example embodiments.

FIG. 8 illustrates an example flow diagram of another method, according to certain example embodiments. In an example embodiment, the method of FIG. 8 may be performed by a network entity, network node, or a group of multiple network elements in a 3GPP system, such as LTE or 5G-NR. For instance, in an example embodiment, the method of FIG. 8 may be performed by a UE, for instance similar to apparatus 10 illustrated in FIG. 9(a).

According to certain example embodiments, the method of FIG. 8 may include, at 800, signaling feedback information to a network element. The method may also include, at 805, receiving predicted channel state information values or a predictive model from the network element, and a channel state information trigger based on the feedback information. The method may further include, at 810, determining whether there is a difference between actual channel state information values and the predicted channel state information values or predicted values computed from the predictive model. In addition, the method may include, at 815, signaling, according to the channel state information trigger, a channel state information report to the network element when it is determined that there is a difference between the actual channel state information values and the predicted channel state information values or the predicted values computed from the predictive model.

According to certain example embodiments, the method may also include sending periodic feedback information to the network element. According to other example embodiments, the predicted channel state information values are received periodically from the network element via a radio resource control configuration.

Figure 9A:
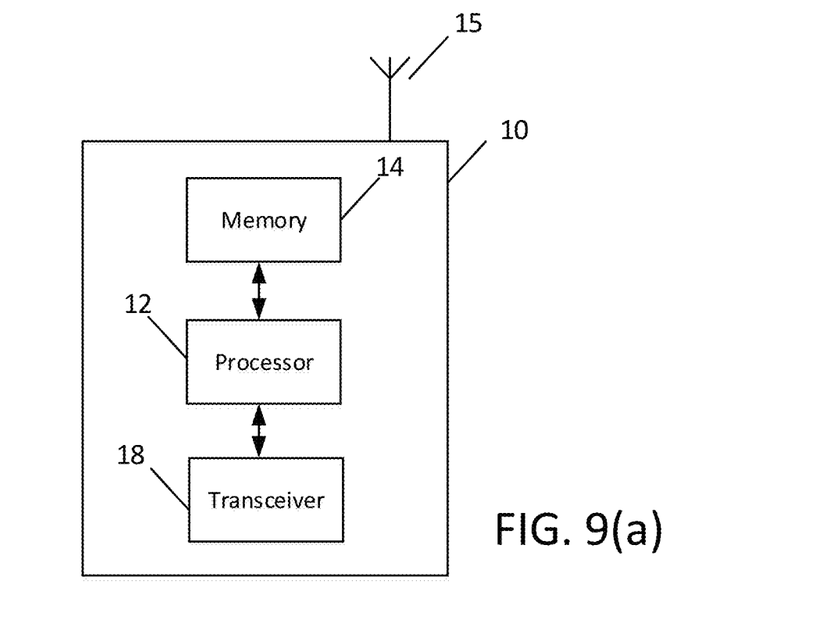
FIG. 9(a) illustrates an apparatus, according to certain example embodiments.

FIG. 9(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 9(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9(a).

As illustrated in the example of FIG. 9(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6 and 8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to signal feedback information to a network element. Apparatus 10 may also be controlled by memory 14 and processor 12 to receive predicted channel state information values or a predictive model from the network element, and a channel state information trigger based on the feedback information. Apparatus 10 may further be controlled by memory 14 and processor 12 to determine whether there is a difference between actual channel state information values and the predicted channel state information values or predicted values computed from the predictive model. In addition, apparatus 10 may be controlled by memory 14 and processor 12 to signal, according to the channel state information trigger, a channel state information report to the network element when it is determined that there is a difference between the actual channel state information values and the predicted channel state information values or the predicted values computed from the predictive model.

Figure 9B:
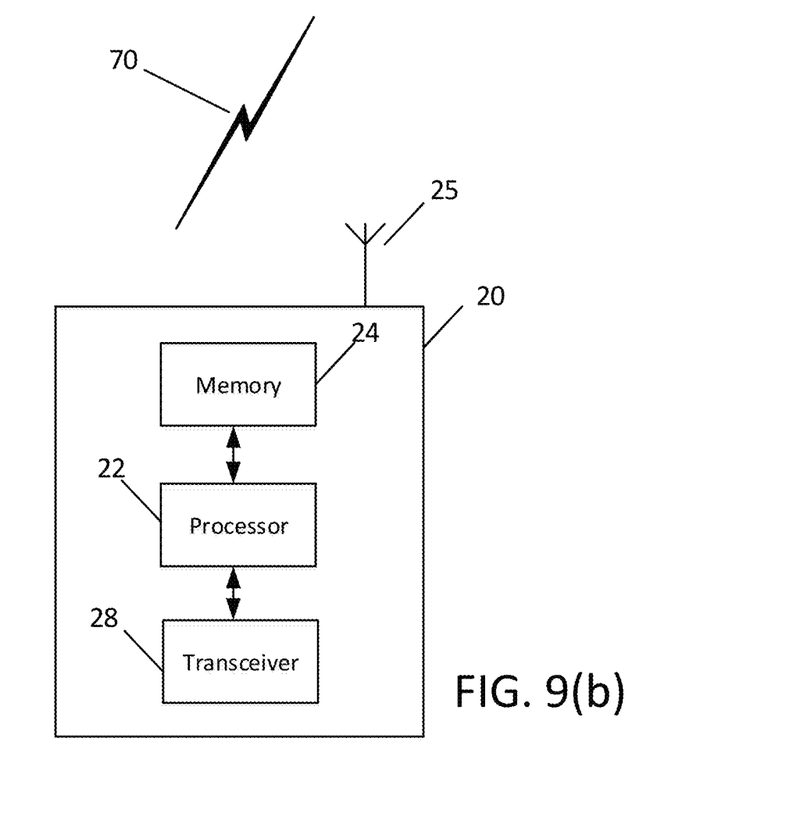
FIG. 9(b) illustrates another apparatus, according to certain example embodiments.

FIG. 9(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 9(b).

As illustrated in the example of FIG. 9(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), MTH, and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to learn channel state information feedback from one or more user equipment as time series data. Apparatus 20 may also be controlled by memory 24 and processor 22 to build a predictive model for user equipment feedback based on the learned channel state information feedback. Apparatus 20 may further be controlled by memory 24 and processor 22 to configure a channel state information trigger with the one or more user equipment based on the predictive model. In addition, apparatus 20 may be controlled by memory 24 and processor 22 to signal predicted channel state information to the one or more user equipment.

Further example embodiments may provide means for performing any of the functions, steps, or procedures described herein. For example one example embodiment may be directed to an apparatus that includes means for signaling feedback information to a network element. The apparatus may also include means for receiving predicted channel state information values or a predictive model from the network element, and a channel state information trigger based on the feedback information. The apparatus may further include means for determining whether there is a difference between actual channel state information values and the predicted channel state information values or predicted values computed from the predictive model. In addition, the apparatus may include means for signaling, according to the channel state information trigger, a channel state information report to the network element when it is determined that there is a difference between the actual channel state information values and the predicted channel state information values or the predicted values computed from the predictive model.

Other example embodiments may be directed to an apparatus that includes means for learning channel state information feedback from one or more user equipment as time series data. The apparatus may also include means for building a predictive model for user equipment feedback based on the learned channel state information feedback. The apparatus may further include means for configuring a channel state information trigger with the one or more user equipment based on the predictive model. In addition, the apparatus may include means for signaling predicted channel state information to the one or more user equipment.

Certain example embodiments described herein provide several technical improvements, enhancements, and/or advantages. In some example embodiments, it may be possible to reduce feedback with minimal overhead during the training phase. It may also be possible to provide predictive feedback information to improve the overall spectral efficiency of the network, and reduce delays by feedback minimization. Certain example embodiments may also provide slightly higher implementation complexity to host and execute machine learning models at the base station.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G $5^{th}$ Generation
5GCN 5G Core Network
BWP Bandwidth Part
CSI Channel State Information
CSI-RS CSI-Reference Signal
CSI-IM CSI-Interference Measurement
CQI Channel Quality Information
DTH Distributed Training Host
eNB Enhanced Node B
gNB 5G or Next Generation NodeB
L1-RSRP Layer-1 Reference Signal Received Power
LSTM Long Short-Term Memory
ML Machine Learning
NG-RAN Next Generation RAN
NR New Radio
RAN Radio Access Network
RRC Radio Resource Control
UE User Equipment

We claim:
1. A method, comprising:
learning channel state information feedback from one or more user equipment as time series data, wherein the time series data comprises data transmitted by the one or more user equipment which is associated with corresponding time information;
building a predictive model for user equipment feedback based on the learned channel state information feedback;
configuring a channel state information trigger with the one or more user equipment based on the predictive model, wherein the channel state information trigger configures the one or more user equipment to send channel state information feedback when a difference between predicted channel state information and an observed or computed value satisfies a learned threshold value that is learned depending on previous instances of radio link failures and an increase in packet loss rate, wherein channel state information includes CRI-RI-CQI and L1-RSRP values;
transmitting learned channel state information feedback information to the one or more user equipment periodically using a new radio resource control configuration including CSI-PredictInfo;
signaling the predicted channel state information to the one or more user equipment,
generating a learned model from the learned channel state information feedback, wherein the learned model includes time series data using LSTMs and polynomial regression, wherein signaling the predicted channel state information comprises configuring the one or more user equipment with the learned model; and
determining a difference between the predicted and actual channel state information; and signaling to the one or more user equipment the difference between the predicted and actual channel state information.

2. The method according to claim 1, wherein signaling the predicted channel state information comprises signaling the learned channel state information feedback to the one or more user equipment.

3. The method according to claim 1, wherein when the predicted channel state information is different from an observed value, the method further comprises receiving channel state information feedback from the one or more user equipment.

4. The method according to claim 3, further comprising updating the predictive model based on the received channel state information feedback from the one or more user equipment.

5. An apparatus, comprising:
at least one processor; and
at least one memory comprising computer program code,
the at least one memory and the computer program code are configured, with the at least one processor, to cause the apparatus at least to:
learn channel state information feedback from one or more user equipment as time series data, wherein the time series data comprises data transmitted by the one or more user equipment which is associated with corresponding time information;
build a predictive model for user equipment feedback based on the learned channel state information feedback;
configure a channel state information trigger with the one or more user equipment based on the predictive model, wherein the channel state information trigger configures the one or more user equipment to send channel state information feedback when a difference between predicted channel state information and an observed or computed value satisfies a learned threshold value that is learned depending on previous instances of radio link failures and an increase in packet loss rate, wherein channel state information includes CRI-RI-CQI and L1-RSRP values;
transmit learned channel state information feedback information to the one or more user equipment periodically using a new radio resource control configuration including CSI-PredictInfo;
signal the predicted channel state information to the one or more user equipment,
generate a learned model from the learned channel state information feedback, wherein the learned model includes time series data using LSTMs and polynomial regression, wherein signaling the predicted channel state information comprises configuring the one or more user equipment with the learned model; and
determine a difference between the predicted and actual channel state information; and
signal to the one or more user equipment the difference between the predicted and actual channel state information.

6. The apparatus according to claim 5, wherein when the predicted channel state information is different from an observed value, the at least one memory and the computer program code are further configured, with the at least one processor, to cause the apparatus at least to:
receive channel state information feedback from the one or more user equipment.

7. The apparatus to claim 6, wherein the at least one memory and the computer program code are further configured, with the at least one processor, to cause the apparatus at least to:
update the predictive model based on the received channel state information feedback from the one or more user equipment.

* * * * *